United States Patent [19]

McKague et al.

[11] Patent Number: 5,954,898
[45] Date of Patent: Sep. 21, 1999

[54] METHOD AND SYSTEM FOR FABRICATING PARTS FROM COMPOSITE MATERIALS

[75] Inventors: Elbert Lee McKague, Fort Worth; James R. Albritton, Aledo, both of Tex.

[73] Assignee: Lockheed Fort Worth Company, Fort Worth, Tex.

[21] Appl. No.: 08/943,071

[22] Filed: Oct. 2, 1997

Related U.S. Application Data

[62] Division of application No. 08/625,780, Mar. 28, 1996, abandoned, which is a continuation of application No. 08/242,371, May 13, 1994, abandoned.

[51] Int. Cl.$^6$ .......................... B32B 31/04; B32B 31/18; B32B 31/20; B29C 3/10
[52] U.S. Cl. ........................ 156/64; 156/182; 156/222; 156/256; 156/264; 156/307.7; 156/312; 264/258
[58] Field of Search ...................................... 156/221, 222, 156/285, 286, 307.3, 312, 64, 182, 256, 264, 307.1; 264/258

[56] References Cited

U.S. PATENT DOCUMENTS

| | | |
|---|---|---|
| 3,131,116 | 4/1964 | Pounds . |
| 3,730,828 | 5/1973 | Meiser . |
| 4,002,790 | 1/1977 | Trewiler . |
| 4,046,937 | 9/1977 | McCaskey, Jr. et al. . |
| 4,135,019 | 1/1979 | Kourtides et al. . |
| 4,182,495 | 1/1980 | Borgmeier et al. . |
| 4,416,717 | 11/1983 | Galasso et al. . |
| 4,443,507 | 4/1984 | Yamada et al. . |

(List continued on next page.)

OTHER PUBLICATIONS

U.S. application No. 08/667,531, Elbert Lee McKague, Jr., filed Jul. 12, 1996.

U.S. application No. 08/667,531, Moris R. Scales, filed Jul. 12, 1996.

U.S. application No. 08/667531, Steven M. Jourdenais, filed Jul. 12, 1996.

Donnellan, et al., Society for the Advancement of Material and Process Engineering, *Non autoclave/Staged Repair Concepts for BMI Composite Structures*, Naval Air Development Center, Warminster, PA, pp. 1–11.

Americain GFM Product Brochure, *Ultrasonic Cutter*, American GFM, 1200 Cavalier Blvd., Chesapeake, Virginia 23323.

Americain GFM Product Brochure, *Innovation For Our World*, American GFM, 12000 Cavalier Blvd., Chesapeake, Virginia 23323.

Exhibit "A": Low Cost Composite Processing SOL, Publication Date–Feb. 11, 1992, Sponsor: R&D Contracting Directorate, WPAFB, OH 45433–6503.

Proposal for Low Cost Composite Processing, vol. 1–Technical; General Dynamics; FZP–2456 dated Mar. 20, 1992; MISC–FW#0110–22067.

*Primary Examiner*—Richard Crispino
*Attorney, Agent, or Firm*—Baker & Botts, L.L.P.

[57] ABSTRACT

A method for fabricating a composite part (42) from a plurality of composite layers (14) is provided. The method includes laying-up the composite layers (26) one upon another to form a collection of layers in a configuration and debulking the configuration of layers (26) by applying pressure sufficient to reduce the thickness of the layers to within approximately twenty percent (20%) of the part's final thickness. The debulked layers (28) may then be stored, generally at room temperature. To later form the part, the debulked layers (28) are heated to a temperature above their glass transition temperature and formed into the part's final shape. Heat may then be continuously applied to the layers while holding them in the part's final shape with sufficient force to achieve and maintain the part's thickness and density and until the heating causes the layers to become sufficiently cured so that the part's shape, thickness, and density are maintained.

81 Claims, 4 Drawing Sheets

U.S. PATENT DOCUMENTS

| | | |
|---|---|---|
| 4,443,566 | 4/1984 | Ying . |
| 4,454,201 | 6/1984 | Uram, Jr. . |
| 4,496,415 | 1/1985 | Sprengling ............................ 156/283 |
| 4,591,613 | 5/1986 | Karam et al. . |
| 4,604,319 | 8/1986 | Evans et al. . |
| 4,683,018 | 7/1987 | Sutcliffe et al. . |
| 4,713,299 | 12/1987 | Taylor et al. . |
| 4,749,767 | 6/1988 | Chaudhari et al. . |
| 4,750,961 | 6/1988 | Pflug et al. . |
| 4,786,343 | 11/1988 | Hertzberg . |
| 4,789,704 | 12/1988 | Stenzenberger et al. . |
| 4,800,111 | 1/1989 | Pflug et al. . |
| 4,808,646 | 2/1989 | Dahms . |
| 4,839,229 | 6/1989 | Jellinek et al. . |
| 4,842,670 | 6/1989 | Callis et al. ............................ 156/382 |
| 4,865,807 | 9/1989 | Petershofer et al. . |
| 4,869,770 | 9/1989 | Christensen et al. . |
| 4,874,661 | 10/1989 | Browne et al. . |
| 4,913,759 | 4/1990 | Wright . |
| 4,963,215 | 10/1990 | Ayers . |
| 4,983,433 | 1/1991 | Shirasaki . |
| 5,002,821 | 3/1991 | Browne et al. . |
| 5,064,130 | 11/1991 | Blaimschein et al. . |
| 5,209,804 | 5/1993 | Trudeau . |
| 5,217,766 | 6/1993 | Flonc et al. ............................ 156/283 |
| 5,320,494 | 6/1994 | Reinfelder et al. ..................... 416/226 |
| 5,328,540 | 7/1994 | Clayton et al. ........................ 156/285 |
| 5,397,415 | 3/1995 | Manabe et al. . |

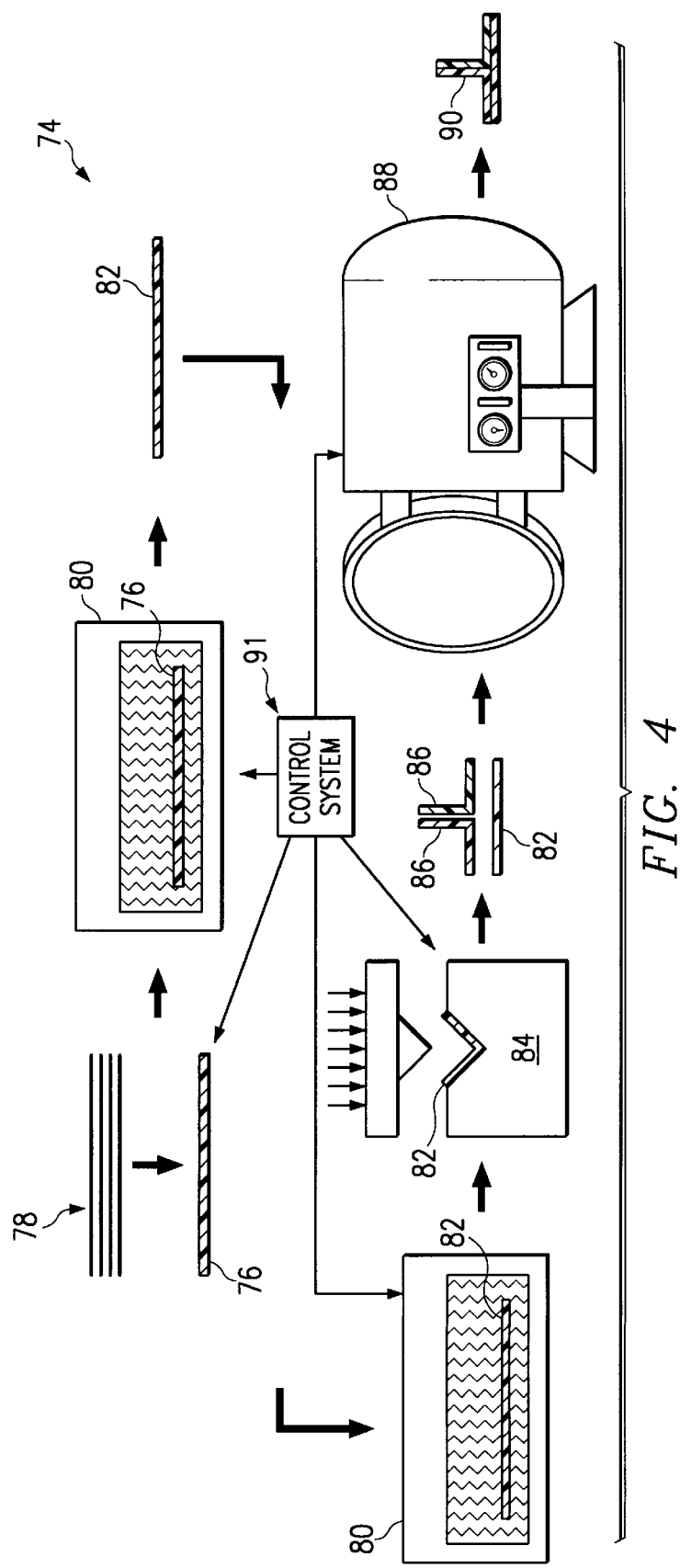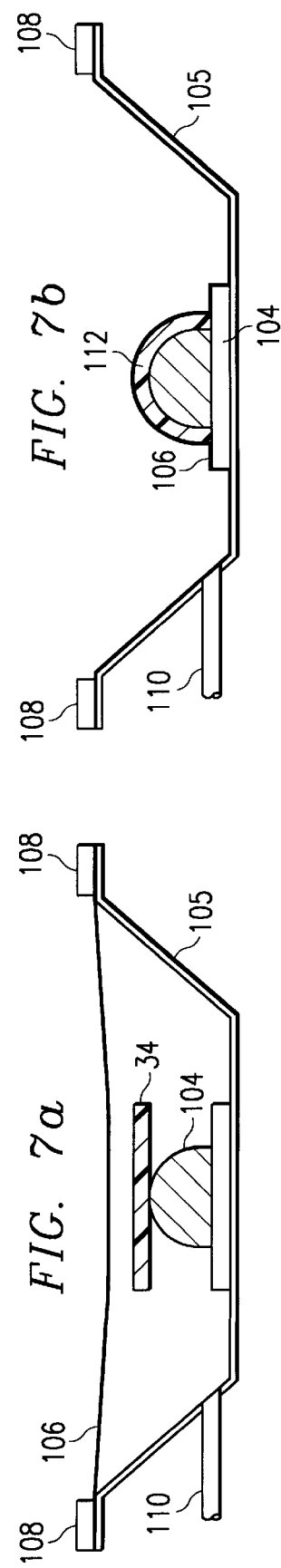
FIG. 4
FIG. 7a
FIG. 7b

METHOD AND SYSTEM FOR FABRICATING PARTS FROM COMPOSITE MATERIALS

CROSS REFERENCE TO RELATED APPLICATIONS

This application is a divisional of application Ser. No. 08/625,780, filed Mar. 28, 1996 by Elbert L. McKague and James R. Albritton entitled "Method and System for Fabricating Parts From Composite Materials," abandoned, which is a continuation of application Ser. No. 08/242,371, filed May 13, 1994 by Elbert L. McKague and James R. Albritton entitled "Method and System for Fabricating Parts From Composite Materials," now abandoned.

TECHNICAL FIELD OF THE INVENTION

This invention relates in general to the field of forming parts from composite materials. More particularly, the invention pertains to the simultaneous forming of multiple layers of composite materials into a desired shape or shapes and curing the materials to maintain the desired shape(s).

BACKGROUND OF THE INVENTION

Several industries desire composite structures or parts for their high strength and lightweight. The aircraft industry, for example, uses composite structures to make lightweight structural components.

Many approaches have been previously developed for forming multiple layers of composite material into a desired shape or shapes. The most common, particularly in the aircraft industry, involves placing individual layers of material onto a form having a desired shape, and then curing the layers. Curing the material through application of heat and pressure fully compacts or debulks the composite material. The cured composite material then has the desired shape and strength. Forming parts in this way does not involve significant reshaping of the composite material during curing and may be very time consuming.

Disadvantages inherent in the aforementioned process include the very tedious and time consuming operation of laying individual layers of composite material directly onto a tool to obtain a final, non-flat desired shape. The very labor intensive process of placing the layers of material onto a form may require many highly-skilled man-hours for each part, and is, therefore, very expensive.

Additionally, the aforementioned process may require stopping after placement of every few layers of material and providing some form of mechanical compaction to the material. This may be necessary to achieve final full compaction of the layers. Failure to achieve full compaction of the material layers prior to curing may result in wrinkles and other anomalies in the final structure, since as individual layers compact, the local path-lengths of the fibers in the layers change. Wrinkles and other anomalies in the cured structure are aesthetically and structurally undesirable.

Previously developed methods for forming composite parts also fail to assure uniformity between parts. In the prior art, each part is separately made. Each part is formed by the process of placing individual layers onto a form, and then curing the layers while on the form. The cured part is removed from the form allowing the next part to be made by the same process. By this method a number of parts can be formed. Unfortunately, variations in compaction, in resin bleeding from the part, and in fiber "washing" or dislocations from resin bleeding, tend to occur because compaction is occurring three dimensionally, and because of the low viscosity of the resin. These factors may yield parts that lack uniformity. Previously developed methods for building composite parts are, therefore, not compatible with low-cost, high-volume manufacturing methodologies.

Composite parts fabricated by previously developed methods often require machining after curing, e.g., routing, grinding, etc., in order to meet final dimension requirements. This machining adds additional time and expense to the process of fabricating the part and can result in damage to the part by delamination of the cured layers.

Yet another disadvantage of the previously developed methods for fabricating composite parts is their incompatibility with in-process control (IPC), statistical process control (SPC), and total quality (TQ) methodologies. IPC, SPC and TQ require repeatable, measurable results to obtain full effectiveness. The custom approach of the prior art to fabricating composite parts is not amenable to obtaining the benefits of IPC, SPC and TQ, i.e., high quality, high yield, and low cost.

Previously developed methods for forming composite parts often do not provide acceptable results when forming complex parts from two or more sub-parts or pre-forms by "co-curing". In co-curing, two or more sub-parts are made into a single part by placing the sub-parts in the desired orientation and curing the combination. Since the prior art requires the individual layers of a sub-part to be laid-up in their final shape on a form, joining two or more individual sub-parts to make a part, e.g., two channels and two plates to form an I-beam, is very difficult. If a foreign material, e.g., backing paper or tape, is accidentally trapped between the layers during layup of a part, there is little likelihood that it will be detected. As a result, high labor costs may be invested in a complex, co-cured part that must be scrapped due to the inclusion.

Prior methods for fabricating composite parts often require that the individual composite layers be stored in a freezer prior to lay-up. This adds additional handling and equipment costs in fabricating a composite part.

Therefore a need has arisen for an improved method and system for fabricating parts from composite materials.

A need further exists for an improved method and system for reducing the time necessary for fabricating composite parts.

A further need exists for a low-cost method and system for fabricating parts from composite materials.

Yet another need exists for a method and system for fabricating multiple uniform parts from composite materials that do not require significant amounts of machining after curing.

Another need exists for a method for fabricating composite parts compatible with IPC, SPC, and TQ.

An additional need exists for a method and system for fabricating complex three-dimensional parts from composite materials.

Yet another need exists for a method and system for fabricating composite parts that eliminate the need for special handling and storage of composite layers.

SUMMARY OF THE INVENTION

In accordance with the present invention, a method and system are provided that substantially eliminate or reduce disadvantages and problems associated with previously developed methods and systems for fabricating parts from composite materials.

The present invention provides a method for fabricating a composite part having a final shape, thickness, and density from a plurality of composite layers. The present method includes laying-up the composite layers one upon another to form a collection of layers in a configuration and debulking the configuration of layers by applying heat and/or pressure sufficient to reduce the thickness of the layers to within approximately twenty percent (20%) of the part's final thickness. The debulked layers may then be stored, generally at room temperature. The method further includes heating the debulked layers to a temperature above their glass transition temperature and forming all of the heated layers into the part's final shape. Then, by continuing the application of heat to the layers while holding them in the part's final shape with sufficient force to achieve and maintain the part's thickness and density and until the heating causes the layers to become sufficiently cured, the part's shape, thickness, and density are maintained.

Another aspect of the present invention is a method for fabricating a plurality of composite parts having a final shape, thickness, and density from a plurality of pre-forms, each pre-form made from a plurality of composite layers and having a shape. The method includes laying-up the composite layers one upon another to form a collection of layers in a configuration. The configuration of layers is then debulked by applying heat and/or pressure sufficient to reduce the thickness of the layers to within approximately twenty percent (20%) of the part's final thickness. The debulked layers may then be stored, generally at room temperature. Next, a plurality of pre-form cut-outs may be cut from the debulked layers. The cut-outs are then heated to a temperature above their glass transition temperature and all of the layers are formed into each pre-form's final shape. These steps may be repeated for all other pre-forms.

The method further comprises arranging each part's pre-forms into a part's shape and heating the pre-forms to a temperature above their glass transition temperatures. By applying sufficient pressure to the heated pre-forms they may be joined. The pressure and heat should be sufficient to achieve and maintain the part's final thickness and density and should be maintained until the heating causes the pre-forms to become sufficiently cured so that the part's shape, thickness, and density are maintained. This process may be repeated for all other parts.

Yet another aspect of the present invention provides a system for fabricating a composite part having a final shape, thickness, and density from a plurality of composite layers. The system includes a debulker for debulking a collection of layers in a configuration by applying pressure sufficient to reduce thickness of the layers to within approximately twenty percent (20%) of the part's final thickness. The present system also includes a heater for heating the debulked layers to a temperature above their existing glass transition temperature, and a forming mechanism for forming all of the heated layers into the part's final shape. Either the heater or forming mechanism is further operable to continue the application of heat to the layers while holding them in the part's final shape with sufficient force to achieve and maintain the final thickness and density of the part and until the heating causes the layers to become sufficiently cured so that the part's shape, thickness, and density are maintained.

A technical advantage of the present invention is the ability to reshape thermoset composite materials into a desired final shape.

The present invention provides another technical advantage of a method for forming composite parts to net dimensions minimizing the need for post-forming machining.

An additional technical advantage of the present method and system is that it can be used to produce multiple uniform parts. The method may be monitored through IPC, SPC, and TQ so that maximum quality, yield, and efficiency may be obtained. This allows for achieving lower cost per part than by prior methods.

The present invention provides yet another technical advantage of a method for forming complex three-dimensional composite parts through co-curing.

Another technical advantage of the present invention is a process by which compacted composite pre-forms can be generated and then stored, often at room temperature, until subsequent co-curing operations.

BRIEF DESCRIPTION OF THE DRAWINGS

For a more complete understanding of the present invention and advantages thereof, reference is now made to the following descriptions taken in conjunction with the accompanying drawings in which like reference numbers indicate like features and wherein:

FIG. 4 illustrates another embodiment of the present method and system for preparing pre-forms and subsequent co-curing operations;

FIGS. 7a and 7b show an embodiment of the present method and system using a diaphragm vacuum chamber;

DETAILED DESCRIPTION OF THE PREFERRED EMBODIMENT

Preferred embodiments of the present invention are illustrated in the FIGURES, like numerals being used to refer to like and corresponding parts of various drawings.

The method and system of the present invention may have applications in many industries. The oil and aircraft industries are two example industries that can benefit from the present method and system for fabricating lightweight composite parts.

Figures 1, 2:
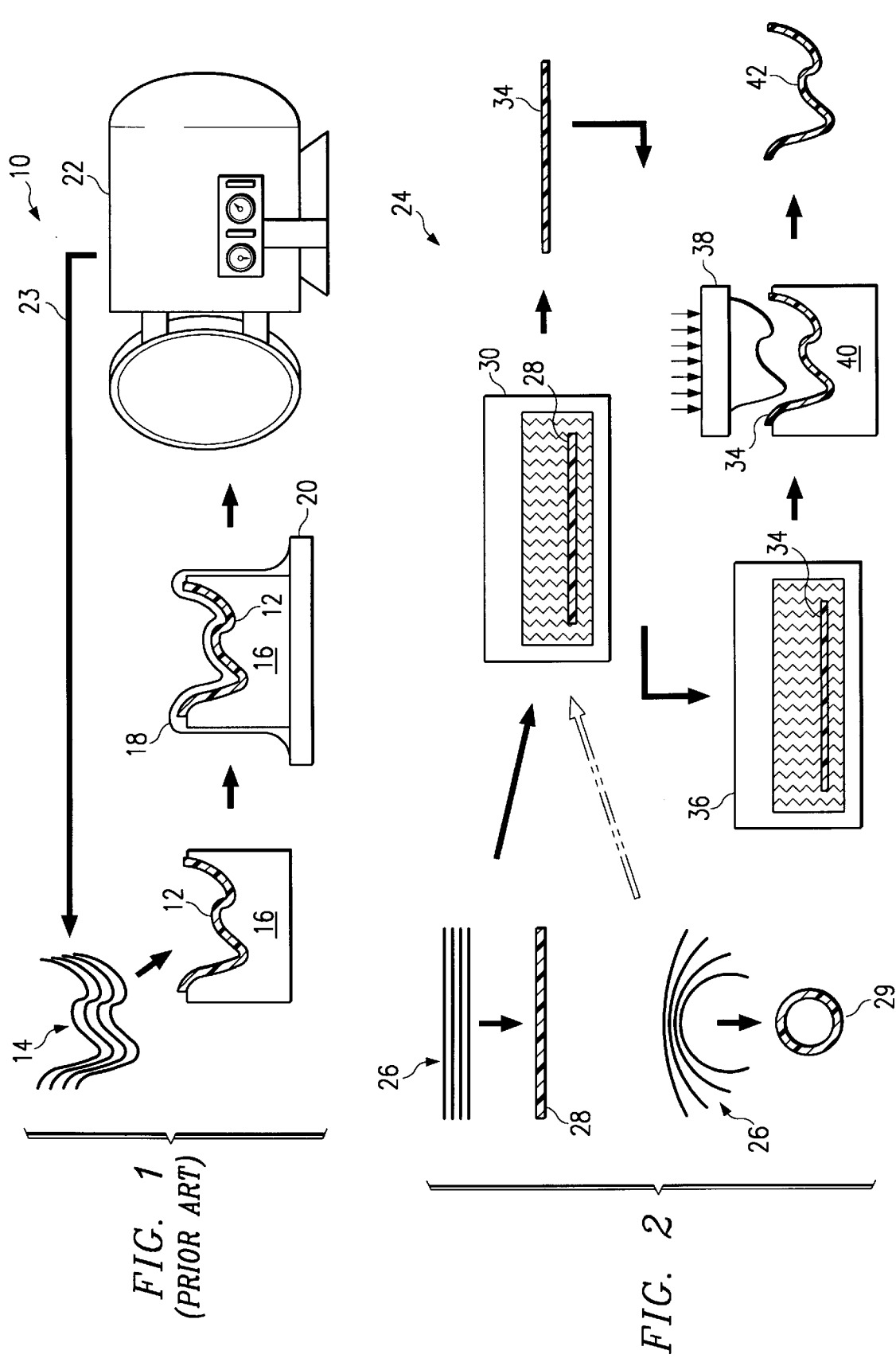
FIG. 1 diagrammatically illustrates a prior art process for fabricating parts from composite materials.
FIG. 2 diagrammatically illustrates an embodiment of the present method and system for fabricating parts from composite materials.

FIG. 1 illustrates a previously developed process 10 for fabricating composite parts. In process 10, forming composite laminate or part 12, generally consisting of several individual layers 14, often called laminae or lamina, requires laying one layer at a time directly onto tool 16 having the part's final shape. A flexible vacuum bag 18 is sealed around tool 16 and layers 14 to base 20 to provide a means for applying pressure for debulking and curing composite laminate 12.

The assembly of lamina layers 14, tool 16, bag 18, and base 20 may then be placed in curing chamber 22 for curing. Curing chamber 22 may be embodied in an autoclave, and autoclave 22 will be referred to hereinafter. Autoclave 22 applies heat and pressure to lamina layers 14 for curing and consolidating the layers into laminate 12. When applying heat and pressure to laminate 12, the resin in the laminate may be prone to "squeeze-out" from vacuum bag 18 due to a drop in viscosity of the resin in laminate 12. Preventing squeeze-out may require using material dams on the forms adding to their cost and complexity. Cured laminate 12 is then removed from autoclave 22 after a suitable time period yielding a composite part.

Arrow 23 indicates that some parts may require several passes through flow 10 to form a composite part to the desired dimensions. At each step several lamina layers 14 are added to a partially cured laminate, vacuum bag 18 is resealed around the composite material and form, and the entire assembly is again placed in autoclave 22 for debulking. This process is repeated until a part having the desired dimensions is achieved. By this process a composite part may be formed. It is noted that no significant reshaping of layers 14 occurs after they are initially laid to the contour on tool 16.

FIG. 2 shows an embodiment of the present method and system for fabricating a part from composite materials. In flow 24 of FIG. 2, individual lamina layers 26 are formed into a convenient shape, such as flat sheet 28 or cylinder 29. The remaining discussion of flow 24 will focus on processing sheet 28, it being understood that the process applies equally to cylinder 29. It is also noted that individual lamina layers 26 may be cut into a part's pattern prior to the laying-up process. This eliminates the need to cut the collection of layers during subsequent processing.

The "laying-up" process shown in flow 34 of FIG. 2 may be accomplished either by hand or with an appropriate placement machine. Flat laminates 28 can be laid-up by, for example, either a broadgoods spreader or tape laying machine. Curved or cylindrical laminates 29 can be laid-up with, for example, a filament or tape winding machine, or with a tow placement machine. Using machinery to lay-up individual lamina layers 26 automates a significant part of flow 24 and helps reduce processing costs and time over previously developed methods.

Layers 26 are then debulked through the application of pressure forming laminate sheet 28. Debulking of layers 26 can be achieved by any convenient means, such as pressure rolling or plate pressing. A preferred method is placing a vacuum-bag over lamina layer 26, evacuating the bag, and allowing atmospheric pressure to be transmitted to the laminate surface of layers 26. Debulking layers 26 results in flat laminate sheet 28 or any other convenient shape. Laminate sheet 28 resulting from debulking has a thickness within approximately twenty percent (20%) of the nominal, desired, final thickness for the part to be made with laminate sheet 28. The value of 20% of the nominal, desired, final part thickness is a guideline only, it being understood that variations above and below 20% may be achieved without departing from the inventive concepts of the present invention.

Heat may also be applied to laminate sheet 28 with an appropriate heat source like oven 30 in connection with the selected debulking method. Heating laminate sheet 28 may be necessary to reduce the resin viscosity in lamina layers 26 sufficient to enable debulking to within the desired twenty percent (20%) of the part's final thickness. Heating must be controlled so that the glass transition temperature ($T_g$) of the composite material is not advanced to a temperature that will be used for subsequent processing of the material. The $T_g$ for a material is the temperature between a super-cooled liquid and its glassy solid. After debulking of laminate 28 is completed, laminate 34, being uncured or only partially cured, can be stored for extended periods of time until further processing is necessary. Laminate 34 can generally be stored at room temperature. Laminate 34 should be kept in a low-humidity storage environment due to the hygroscopic nature of composite materials. At this point in flow 24, it may be desirable to cut laminate 34 into a part's pattern. Defining a part's pattern in laminate 34 eliminates the need for cutting or trimming of the part in subsequent processing.

Further processing in method 24 of FIG. 2 involves heating uncured or partially cured laminate 34 in, for example, oven 36, an autoclave, or other suitable means, to a temperature greater than the $T_g$ for the composite material. While hot, laminate 34 may be reshaped through the application of appropriate force by tool 38 and form 40, thereby forming part 42. It is noted that the thermal history of laminate 34 up to its forming must be controlled so that the material of laminate 34 is at a suitably low viscosity at the time of forming to allow sliding of one layer over another. Also, the material of laminate 34 should be at a sufficiently low degree of polymerization so that mechanical strength is not compromised by breakage of weak crosslinks during the bending and sliding of layers that occurs during forming.

Because laminate 34 has been partially cured it is less subject to resin squeeze-out when compressed by tool 38, thereby eliminating or reducing the need for carefully applied material dams on form 40. As necessary, heating may be continued until curing of the composite material has advanced sufficiently that the final shape of part 42 can be maintained during subsequent operations, including additional curing.

A relatively low forming temperature at which laminate sheet 34 is formed may be desirable for forming laminate sheet 34 into part shape 42 on tool 40 by hand.

Hand forming may be desirable when forming complex composite parts.

A technical advantage of the present method for fabricating composite parts is illustrated in FIG. 2. The method of FIG. 2 provides the capability to integrate sensors and/or sensor connections into the composite part as it is formed. By placing appropriate fiber optic and sensing devices between lamina layers 26 it is possible to form part 42 having an integrated sensor. Numerous composite parts having integrated sensors can be used throughout a platform, such as an aircraft, to create a "smart structure." Providing information from the sensors in the composite parts to a processor or other output device allows the structure to be monitored in real time.

Figure 3:
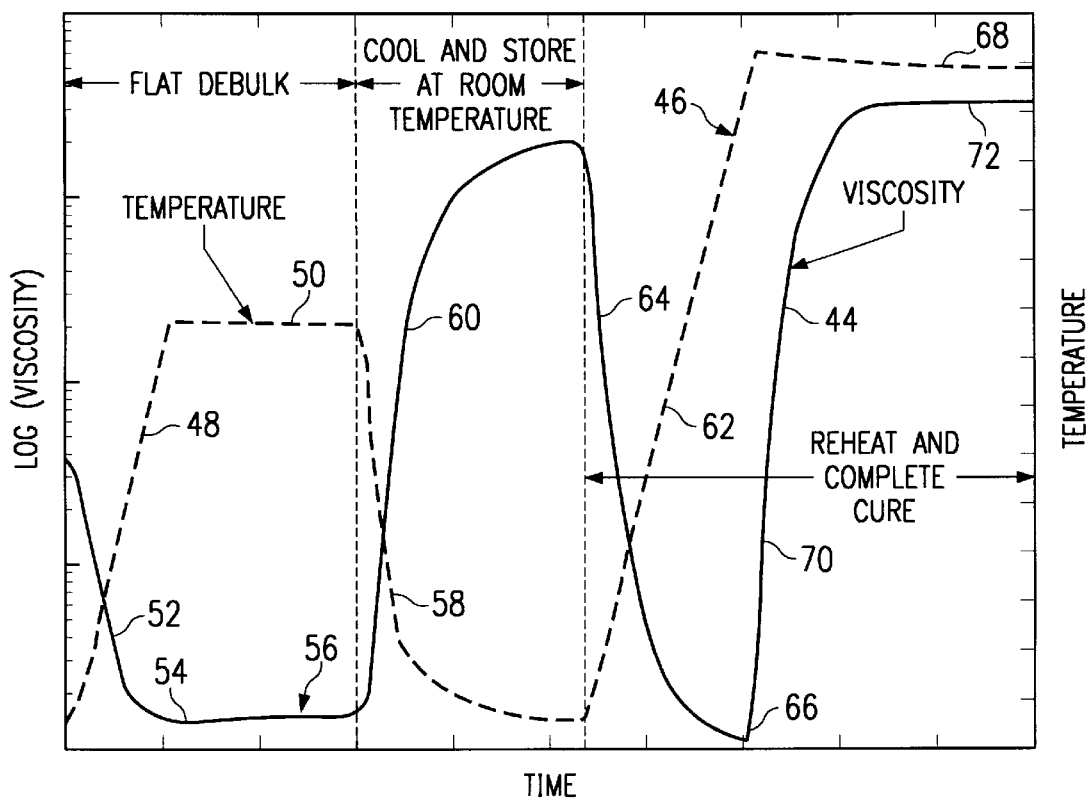
FIG. 3 shows the viscosity of a typical thermoset resin at several temperatures during the present method.

FIG. 3 illustrates the relationship between a composite material's viscosity and the temperature of the material and aids in understanding the present method and process. In FIG. 3, temperature is plotted on the right-hand Y-axis, viscosity is plotted on the left-hand Y-axis (log scale), and time is plotted on the X-axis. When heating is required during debulking of a laminate, the temperature of the laminate is ramped up as represented by section 48 of curve 46 to hold-temperature 50. During the increase of temperature in region 48, the viscosity of the resin drops as represented by region 52 of curve 44 to low-level 54. Low-level 54 represents a phase change from solid to liquid for the laminate. During the time at hold-temperature 50, the viscosity of the resin begins to increase slightly as a result of a linear polymer chain extension forming in the composite material. The increase in viscosity is represented by region 56 of curve 44. The increase in viscosity in region 56 is not severe. This part of FIG. 3 represents, for example, heating laminate 28 in oven 30 in FIG. 2.

At the end of hold-temperature region 50, the temperature ramps back down, as represented by region 58, causing the liquid composite material to return to a solid-state as represented by region 60 of curve 44. Note that the viscosity of the composite material following cooling is higher than it was prior to debulking. This increased viscosity is the result of changing the $T_g$ of the resin through heating while debulking and makes the debulked composite material stable at room temperature. At this point, the composite material has been reduced to within approximately 20% of a final desired dimension. Pre-form 34 of FIG. 2 is an example of a composite material which has been debulked as described.

Upon reheating the composite material, as represented by region 62 of curve 46, the viscosity of the material returns to a low-level as represented by region 64 of curve 44. Minimum-viscosity level 66 of region 64 is controlled by heating rate 62 and a hold-temperature as represented by region 68 of curve 46. With the viscosity at low level 66, laminate 34, for example, may be reshaped with tool 38 and form 40 of FIG. 2. Temperature is held at hold-temperature 68 for the appropriate time necessary for the resin material or materials in the composite to solidify. A viscosity build-up is shown in region 70 of curve 44 during the hold temperature period and is attributed to cross-links solidifying in the composite material. The length of time at hold-temperature 68 is peculiar for each type of composite material. Once sufficient cross-linking occurs the composite part as represented by part 42 of FIG. 2, may be removed from the heat source.

FIG. 4 illustrates another embodiment of the present method and system. Flow 74 of FIG. 4 illustrates a method for forming debulked laminates that are suitable for subsequent co-curing with other debulked laminates. Laminate 76 is formed from multiple lamina layers 78 laid to form a convenient shape, such as a flat surface. Layers 78 may be debulked by vacuum bag pressure as previously described in connection with discussions of FIG. 2 and with heat, when necessary, in oven 80. This gives debulked laminate 82 a convenient shape.

Subsequently heating laminate 82 in oven 80 allows laminate 82 to be formed into a pre-form in tool 84 by the application of force. Laminate 82 may be shaped into a pre-form of many shapes as represented by right angle pre-forms 86. Many other shapes not specifically illustrated in FIG. 4 can be formed by this process.

After forming, the pre-forms are rapidly cooled before the onset of accelerated cross-linking described in connection with region 70 of curve 44 of FIG. 3. Multiple pre-forms may then be located adjacent to one another and subjected to a co-curing cycle in, for example, autoclave 88. The pre-forms are cured together with or without an adhesive and interfacing layer. By appropriate consolidation pressure, fully cured part 90 is produced.

The process of FIG. 4 achieves a technical advantage of forming complex composite parts from pre-forms. Because the pre-forms have defined shapes that are dimensionally stable at room temperature prior to co-curing, they can be indexed by techniques known in the art to ensure their proper alignment prior to co-curing. This helps ensure that part 90 meets the required dimensions. The joining of pre-forms by this method is also compatible with automatic construction methods using robotics. Computer controlled robotics can be appropriately programmed to pick and place pre-forms in the desired orientation so that they may be co-cured to form a part. This, in-turn, results in improved yields and quality than generally available with custom hand-forming of composite parts.

FIG. 4 also demonstrates how the present process can be enhanced with control system 91. Control system 91 can be used to control the various steps in flow 74. Control system 91 can, for example, ensure optimum temperature and pressure profiles, based on the type of composite materials being used, are applied throughout flow 74. This provides the present method with a technical advantage of higher yields and increased uniformity part-to-part with the present method. Control system 91 may be embodied in any commonly available computer controller or programmable controller.

Figure 5:
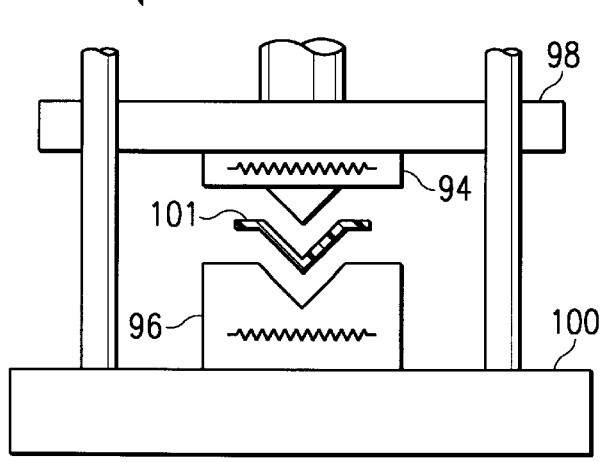
FIG. 5 shows a matched tool pre-forming process in accordance with an embodiment of the present invention.

FIG. 5 illustrates another variation of the present method and system for fabricating a composite part. FIG. 5 shows forming tool 92 which can both form and a cure laminate. Tool 92 includes heated tooling halves 94 and 96 attached to press platens 98 and 100, respectively. Tooling halves 94 and 96 are brought together with enough force to reshape a laminate into the shape of pre-form 103. By continuing the application of force and heat with tooling halves 94 and 96 to pre-form 101, its curing may be completed. Alternatively, some additional curing of pre-form 101 may occur after removal from tool 92.

Figure 6:
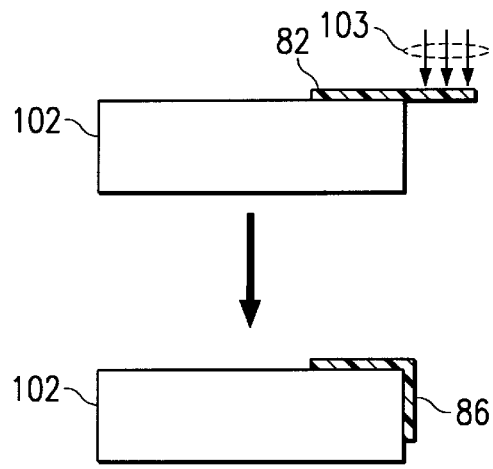
FIG. 6 illustrates an alternate method for forming a right-angle composite pre-form within the concepts of the present invention.

FIG. 6 shows an alternate method for forming right-angle pre-forms 86. Laminate 82 may be shaped on right-angle form 102 through the application of force 103 to laminate 82 to form right-angle pre-form 86. FIG. 6 illustrates that various forms can be used within the concepts of the present method for forming various shapes of pre-forms and parts. Also, while the pre-forms and parts thus far described are formed with a single forming step, the present inventive process may employ several serial forming steps to achieve the desired final pre-form or part shape.

FIGS. 7a and 7b show the use of a diaphragm vacuum chamber for forming composite parts from laminate sheets.

In FIG. 7a, previously debulked laminate 34 is placed over tool 104 in chamber 105. Chamber 105 is covered with deformable membrane or diaphragm 106. Diaphragm 106 made of rubber has been found to be acceptable. Diaphragm 106 is sealed to chamber 106 by, for example, clamping rings 108. The entire assembly is heated to a point above the glass transition temperature of the resins in laminate 34. Vacuum line 110 is coupled to a vacuum tool (not explicitly shown), and sealed chamber 105 is evacuated. Evacuation of chamber 105 causes diaphragm 106 to apply a force against laminate sheet 34. The force applied by diaphragm 106 may be atmospheric pressure, or alternatively, the entire assembly can be placed in an autoclave where additional pressure can be applied to laminate sheet 34 once chamber 105 is evacuated.

FIG. 7b shows the results of the application of appropriate force to laminate sheet 34. Laminate sheet 34 is formed to shape 112 by application of the force from deformable diaphragm 106. Formed laminate 112 may then be cured as previously described so that it retains its shape.

Figure 8:
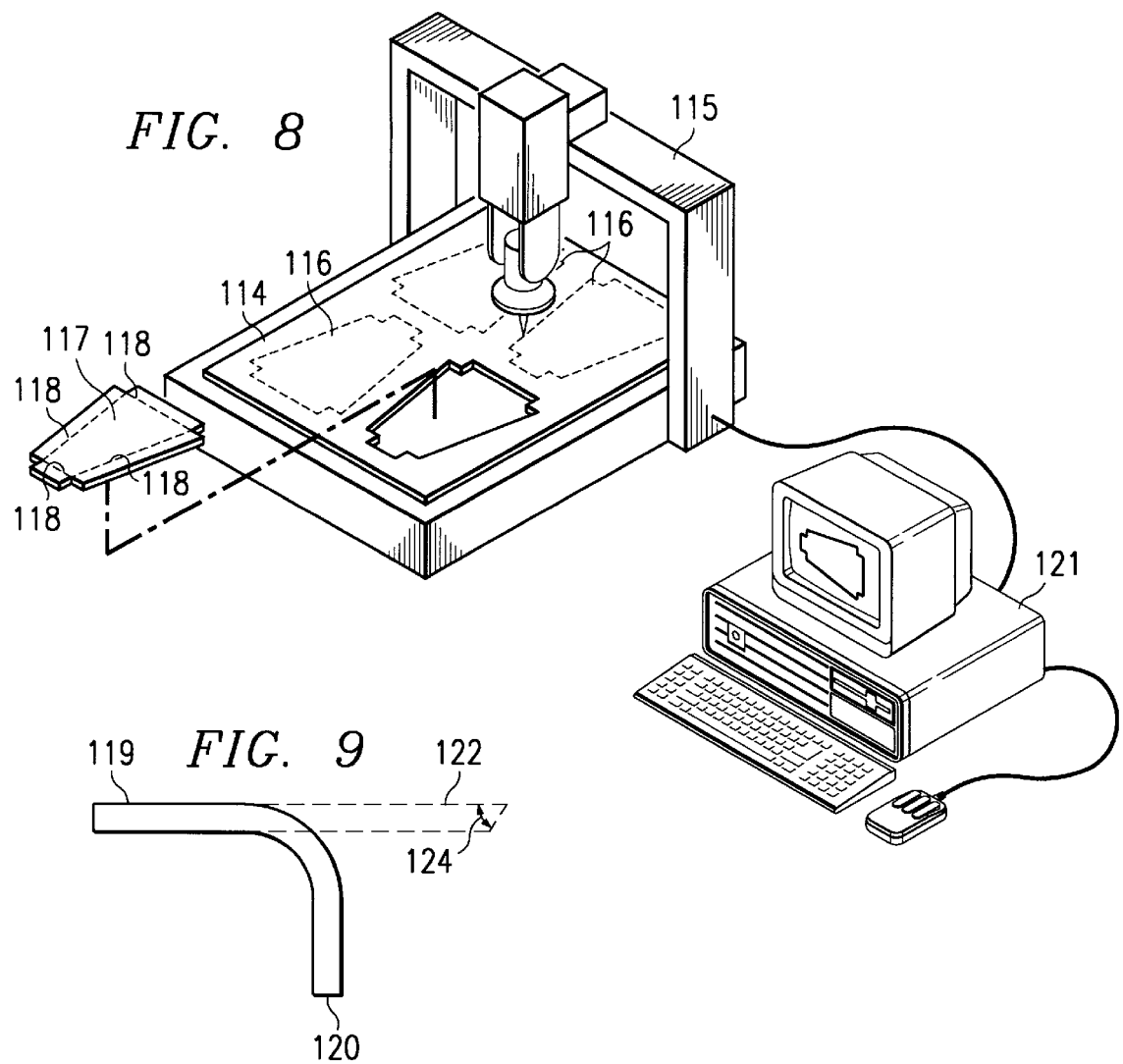
FIG. 8 depicts a debulked composite sheet with multiple part patterns therein and a cutting device for removing the parts.

FIG. 8 depicts laminate sheet 114. Laminate sheet 114 has been previously formed by debulking through one of the processes previously identified. Also shown defined in sheet 114 are multiple part cut-outs 116. In FIG. 8, multiple cut-outs 116 are shown having identical patterns. This is for illustrative purposes only as several different part patterns may be defined in laminate sheet 114 without departing from the inventive concepts of the present invention. Removed cut-out 117 also shows forming lines 118 for illustrative purposes only. Cut-out 117 can later be formed through the methods previously described in connection with the discussions of FIGS. 2, 4, 5, 6, 7a, and 7b by bending cut-out 117 along forming lines 118. By this method, multiple cut-outs 116 can be made from single laminate sheet 114. This provides the present invention with technical advantages of uniformity between parts and the ability to produce numerous parts from single laminate sheet 114. This differs from the custom, one-at-a-time approach of previously developed methods for fabricating composite parts.

Shapes 116 in laminate sheet 114 of FIG. 8 can be achieved by cutting with computer controlled cutting device 115. More specifically, cutting is achieved using an ultrasonically vibrated knife operating at a high frequency, such as 20,000 Hz, with an energy sufficient to create a vibrational amplitude that assists in the cutting operation. Relatively thick laminates, up to at least 0.375 inches, can be easily cut. Using high amplitude ultrasonically assisted cutting may be desirable because of the nature of the uncured, debulked laminate material. The ultrasonically assisted knife cleanly and precisely cuts material without resin melting and reaction such as might result from laser cutting, without the contamination that would result from water jet cutting, and without the gumming that would occur with conventional mechanical cutting. Although ultrasonically assisted cutting is preferred, it should be recognized that for some materials and some cutting profiles, laser cutting is an acceptable alternative. For those skilled in the art it will also be apparent that the advantages of creating flat shapes by cutting from a larger laminate may also be achieved by cutting an undebulked laminate, followed by debulking at some later point in processing.

Defining the dimensions of cut-outs 116 in laminate sheet 114 of FIG. 8 can be precisely established by linking computer-aided design tool 121 to computer-controlled cutting machine 115. The design that is created using design tool 121 is established with precise dimensions and tolerances using an appropriate computer language such as CATIA or CAD. The design data is then downloaded to computer controlled cutting machine 115 through an appropriate transfer file such as IGES. Cutting machine 115 is then able to precisely cut pattern 116 to the required dimensions and tolerances from the specified location on laminate sheet 114. The combination of computer-aidied design-tool 121 and computer-controlled cutting device 115 allows for generating cut-outs that when formed by one of the processes previously described, may be formed to the net desired dimensions for the part, except for special features such as pattern-to-tool alignment tabs. This provides a technical advantage of fabricating composite parts that require less post-forming machining than is necessary with previously developed composite part forming techniques. A cutting device manufactured and sold by American GFM of Chesapeake, Va. 23323, model number U.S.-50, has been found to be suitable for cutting device 115.

Figure 9:
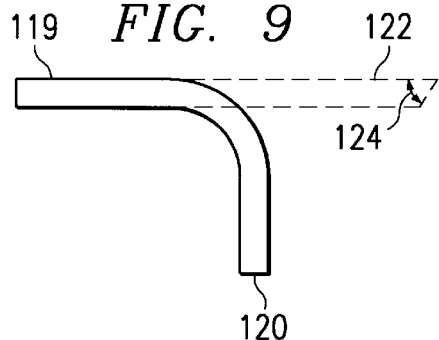
FIG. 9 illustrates a side view of a debulked composite sheet prior to and after forming.

FIG. 9 shows a side view of debulked laminate sheet 119 before and after forming. Laminate sheet 119 may be laminate sheet 34 or 82 of FIGS. 2 and 4 respectively, or laminate cut-out 117 of FIG. 8. In order to ensure perpendicular surface 120 after sheet 119 is formed, it is desirable to cut end 122 at angle 124. Angle 124 of 32.5° has been found to be suitable to ensure that end 122 has perpendicular surface 120 once formed. Cutting sheet 119 at the desired angle can be accomplished during cutting of cut-outs 116 from laminate sheet 114 of FIG. 8. The American GFM cutting device previously identified can be programmed to cut at the desired angle. The angle has been successfully cut in debulked laminates as thick as 0.375 inches. By cutting at an angle with this method, the cut-out can be formed to the net desired dimensions thereby eliminating post-forming machining of the formed part.

For unusually critical dimensions for formed parts, such as an extremely precise tolerance for a flange leg length, then a part such as cut-out 117 in FIG. 8 can be cut oversized, formed but not cured, and then trimmed on a tool to precise dimensions using 5-axis cutting controls. Cutting machine 115 in FIG. 8 that is manufactured and sold by American GFM of Chesapeake, Va. 23323, as model number U.S.-50, has been found to be suitable for such 3-dimensional trimming. After trimming, hard boundaries would be affixed to the tool so that one edge of each boundary would be flush against the trimmed edge of the flanges. These hard boundaries then would provide a precisely located, molded part edge.

Figure 10:
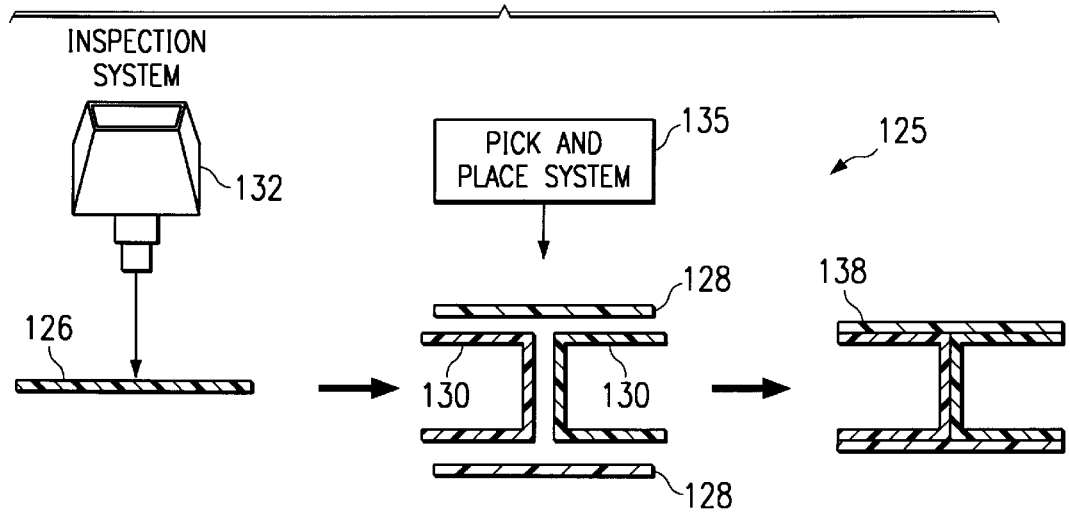
FIG. 10 shows in-process control with the method and system of the present invention.

FIG. 10 illustrates flow 125 for forming a composite part in the shape of an I-beam by the present method and also shows the integration of IPC into the method. Debulked laminate 126 may be formed by one of the methodologies previously described. Debulked laminate 126 may be formed into many pre-form shapes, including flat pre-form 128 and C-channel pre-forms 130. As shown in FIG. 10, flat pre-forms 128 and C-channel pre-forms 130 may be combined to form an I-beam.

Pick and place system 134 can be used in flow 125 for automating the placement and orientation of the pre-forms used to make a complex part. An appropriately programmed system can, for example, automatically place flat pre-forms 128 and C-channel pre-forms 130 in the proper configuration for forming an I-beam. The rigidity of the pre-forms allows the present method and system to achieve a technical advantage of automated handling and placement of the pre-forms thereby reducing labor costs in fabricating complex three-dimensional composite parts.

Another advantage of the present invention is that laminate sheet 126 may be inspected prior to its forming. FIG. 10 shows laminate sheet 126 under inspection from inspection system 132. Inspection system 132 may be any suitable system which detects debris or other anomalies in a laminate sheet. The Laser Ultrasonic Inspection System (LUIS) manufactured and sold by Lockheed Ft. Worth Company of Ft. Worth, Tex. has been found to be suitable for inspection system 132. Inspection system 132 may be coupled to other control systems so that an effective IPC, SPC, and TQ system can be implemented.

If inspection system 132 detects an imperfection in sheet 126, then either sheet 126 will not be used for further processing or the defective portion of the sheet will be avoided when cutting patterns. With this system an unacceptable sheet or portion of a sheet is detected and eliminated prior to its forming and assembly into a final co-cured part. Continuing with the flow of FIG. 10, the final completed part or I-beam 138 made from pre-forms 128 and 130 is shown. It is noted that inspection system 132 can be used at any step in the process of FIG. 10 to detect an anomaly in a sheet or pre-form and to remove the anomaly before it is incorporated into the final part. By this method complex three-dimensional composite parts can be assembled and co-cured with improved reliability and quality. IPC, SPC and TQ methodologies can be implemented into the flow of FIG. 10 to ensure high quality, low cost, and high yield composite parts.

It is noted that the formation of complex three-dimensional parts is not limited to I-beam 138 as depicted in FIG. 10, but many shapes not expressly shown can be made with the present method.

EXPERIMENTS

Several significant experimental steps have led to the reduction to practice of the present invention. Tests were conducted to evaluate the effect of degree of debulking on the ability to handle and form composite material when employing the present process. A series of flat laminates were laid up using IM7/8551-7A, a Hercules, Inc., product consisting of a thermosetting, toughened epoxy resin reinforced with graphite fibers. Each laminate was debulked to a different extent using either pressure plates or a vacuum bag, with and without various temperatures for different time periods. The thickness of the laminates were reduced for each panel such that one panel was compacted to 93% of its final cured thickness, whereas other panels were compacted to 92%, 85%, 80%, and 64% of the final cured thickness. For this material, debulking to within 90% of final thickness, required application of some amount of heat. Each laminate was stored for a brief period for convenience, and then heated and formed to a 90° angle. Forming was successfully accomplished in each case, yielding a good quality, wrinkle-free radius. However, debulking to less than 80% of final thickness, resulted in a laminate that was hard to handle and judged to be undesirable, particularly when considering large area parts.

For certain materials, application of heat during debulking may be desirable in order to soften the resin enough to enable reasonable compaction. This heat may also cause an increase in the degree of cure of the resin by promoting some molecular chain extension and limited cross-linking reactions. Too many of these reactions can have deleterious effects on the ability to form the debulked laminate. Additionally, a partially reacted laminate can result in permanent loss of a portion of mechanical properties in the composite material as a result of breaking some of the bonds established during partial curing. Consequently, attention must be given to determine the limits that might be imposed by the addition of heat during the debulking process.

Initial tests on the effects of heat were conducted with IM7/5250-4, a BASF Inc. product, consisting of a thermosetting bismaleimide resin system reinforced with intermediate modulus graphite fibers. Based on supplier information such as gel-time and viscosity profiles during standard cure operations, a cycle was developed that would allow initial compaction and a partial cure of the resin without full gelation and cross-linking. For a typical heating rate of five degrees per minute and a hold temperature of 300° F., hold times ranging from minutes to 120 minutes were identified as acceptable. Acceptability was defined as the cure condition after which reshaping could be achieved with reheat of the laminate. This may be seen more completely in Tables I and II. Various laminates were partially cured at 300° F. for 60, 90 and 120 minutes. In each case, debulking force was applied by the action of atmospheric pressure acting over the surface of a vacuum bag. These also may be seen in Tables I and II.

TABLE I

DEMONSTRATION EXPERIMENTS

| Mat'l | Partial Cure Cycle | | Forming Cycle | | Completion Cycle | | Shape |
|---|---|---|---|---|---|---|---|
| | Hold Temp | Hold Time | Form Temp | Form Pressure | Hold Temp | Hold Time | (Co-cured article) |
| BMI[1] | 300° F. | 60 min | 350° F.[2] | 100 psi | 350° F. | 90 min | 90° angle |
| BMI | 300° F. | 90 min | 350° F.[2] | 100 psi | 350° F. | 90 min | 90° angle |
| BMI | 300° F. | 120 min | 350° F.[2] | 100 psi | 350° F. | 90 min | 90° angle |
| Epoxy[3] | — | — | 250° F.[2,4] | 100 psi | 350° F | 180 min | 90° angle |
| Epoxy | 250° F. | 30 min | 200° F. | 100 psi | 350° F. | 180 min | 90° angle (blade stiffener) |
| Epoxy | 250° F. | 60 min | 250° F.[2] | 100 psi | 350° F. | 180 min | curved Z |
| Epoxy | 250° F. | 60 min | 200° F. | HAND | 350° F. | 240 min | 90° angles (I-beam) |
| Epoxy | 250° F. | 60 min | 200° F. | HAND | 350° F. | 240 min | 90° angles (J-stiffener) |
| Epoxy | 250° F. | 60 min | 200° F. | HAND | 350° F. | 240 min | 90° angles (I-beam) |
| Epoxy | 250° F. | 60 min | 200° F. | HAND | 350° F. | 240 min | 90° angles (blade stiffener) |
| Epoxy | 250° F. | 60 min | 200° F.[2] | 100 psi | 350° F. | 240 min | Beaded Panel |

NOTES
[1]Bismaleimide (BMI) used was IM7/5250-4 from BASF, Inc.
[2]Forming and Completion Together
[3]Epoxy used was IM7/8551-7A from Hercules, Inc.
[4]Formed uncured ply stack (objective was to determine flow/formability behavior of epoxy material prior to stage cycle)

TABLE II

EXPERIMENTS TO DETERMINE PROCESS PARAMETERS (CONTINUED)

| Type of Test | Material | Conditoin | Objective | Significant Result |
| --- | --- | --- | --- | --- |
| DSC[1] | 5250-4[2] | Uncured material | Baseline for degree of cure study | — |
| DSC | 5250-4 | 95 min at 300° F. | degree of cure | 43% cured |
| DSC | 5250-4 | 95 min at 300° F. and 90 min at 375° F. | degree of cure | 90% cured |
| DSC | 5250-4 | 60 min at 300° F. | degree of cure | 17% cured |
| DSC | 8551-7[3]A | Uncured material | baseline for degree of cure study | — |
| DSC | 8551-7A | 30 min at 250° F. | degree of cure | 16% cured |
| DSC | 8551-7A | 40 min at 250° F. | degree of cure | 21% cured |
| DSC | 8551-7A | 50 min at 250° F. | degree of cure | 19% cured |
| DSC | 8551-7A | 60 min at 250° F. | degree of cure | 15% cured |
| DSC | 8551-7A | 70 min at 250° F. | degree of cure | 24% cured |
| DSC | 8551-7A | 80 min at 250° F. | degree of cure | 32% cured |
| DSC | 8551-7A | 90 min at 250° F. | degree of cure | 30% cured |
| DSC | 8551-7A | 100 min at 250° F. | degree of cure | 38% cured |
| DSC | 8551-7A | 110 min at 250° F. | degree of cure | 34% cured |
| DSC | 8551-7A | 120 min at 250° F. | degree of cure | 41% cured |
| TMA[4] | 8551-7A | 60 min at 250° F. and 2.5 hrs at 350° F. | Tg | 402° F. |
| TMA | 8551-7A | 60 min at 250° F. and 3.5 hrs at 350° F. | Tg | 407° F. |
| TMA | 8551-7A | 60 min at 250° F. and 4.5 hrs at 350° C. | Tg | 411° F. |
| TMA | 8551-7A | 90 min at 250° F. and 3.2 hrs at 350° F. | Tg | 404° F. |
| TMA | 8551-7A | Standard Cure Cycle; 250° F. for one hour, ramp to 350° F. and hold for 4 bours | Tg of baseline cure cycle | 398° F. |
| DSC | 8551-7A | 60 min at 250° F. and 2.5 hrs at 350° C. | degree of cure | TBD[5] |
| DSC | 8551-7A | 60 min at 250° F. and 3.5 hrs at 350° F. | degree of cure | TBD |
| DSC | 8551-7A | 60 min at 250° F. and 4.5 hrs at 350° F. | degree of cure | TBD |
| DSC | 8551-7A | 90 min at 250° F. and 3.2 hrs at 350° F. | degree of cure | TBD |
| DSC | 8551-7A | Standard Cure Cycle; 250° F. for one hour, ramp to 350° F. and hold for 4 hours | baseline for degree of cure | TBD |

NOTES:
[1]Differential Scanning Calorimetry
[2]Bismaleimide
[3]Epoxy
[4]Thermo-mechanical-analysis
[5]To be determined Additional tests on the effects of heat were conducted on IM7-8551-7A, a Hercules, Inc. product. Information was generated on the viscosity of the resin system under different curing conditions. Several tests were run to develop a viscosity profile for the resin during partial cure cycles followed by completed cure cycles. The results of these tests led to the identification of an acceptable cure cycle for this resin. An example follows.

The cycle employed a temperature ramp about 5° per minute up to 250° F. The laminate was then held at 250° F. for 60 minutes before being cooled back to room temperature. To complete the resin cure, a second ramp at 5 degrees per minute to 350° F. was employed and held at that temperature for greater than 2.5 hours. Demonstrations of the process with the IM7/8551-7A material have proven that the material can be partially cured, reshaped, and then completely cured successfully.

Tables I and II show additional details on demonstrations that have been performed on both of these materials, inter alia.

Table II, also gives additional information on the cycles for these materials, particularly the 8551-7A.

Phenolic resin based laminates may also be employed in the present method and system. In fact, analysis to date reveals that substantially any thermosetting polymer matrix applied in individual layers to form the laminate can be employed with this invention. Even though specific processing parameters, such as heating rates, hold-temperatures, hold-times and the like have been mentioned, they should not be construed in a limiting sense.

Furthermore, tests have verified that detrimental effects do not result from employing this invention. The glass transition temperature, $T_g$, of the resin is not adversely affected by the present method, and mechanical property tests on composite parts fabricated by the present method have shown that there are no deleterious effects with the invention. specifically, short-beam-shear tests have verified that interlaminar shear strengths are not adversely affected. Similarly, the interlaminar tension test (rooftop test) has been used to verify the mechanical properties of structural shapes after forming.

In operation, this invention is carried out as described hereinbefore. Specifically, the layers are stacked together or wound together and debulked with no more than partial curing to form a desired intermediate shape such as a flat sheet or cylinder. The desired intermediate shape is stored at suitable temperature, and thereafter, the shape is heated and bent to its final shape and held there until cured. This method thus eliminates the tedious and time consuming laying-up of individual layers onto a complex tool shape.

There are numerous additional technical advantages that result from the present invention. Pre-forms for co-curing can be compacted during the initial debulking and partial cure cycle and combined for subsequent co-curing forming. By compacting the laminate prior to co-curing, there is much less opportunity for individual lamina to buckle, wrinkle, or displace. Debulked and partially cured composite pre-forms can be easily handled. Costs for lay-up of individual layers of material onto a flat surface can be significantly less than for lay-up of individual layers over a complex, three-dimensional surface. A large flat sheet can be laid-up from which many pieces may be cut thereby further, lowering the labor required to form individual pieces. Furthermore, debulking a flat panel can be done in one step after completion of lay-up, whereas in previous methods multiple or incremental debulkings were necessary during lay-up in order to control path length differences around small radii as thicknesses were reduced.

Although this invention has been described with a degree of particularity, it is understood that the present disclosure is made only by way of example and that numerous changes in the details of construction and the combination and arrangement of parts may be resorted to without departing from the spirit and the scope of the invention, reference being had for the latter purpose to the appended claims.

What is claimed is:

1. A method for fabricating a composite part from a plurality of composite layers, the part having a final shape, thickness, and density, the method comprising the steps of:
   laying-up the composite layers one upon another to form a collection of layers in a configuration, each layer comprising a thermosetting matrix reinforced by fibers;
   debulking the configuration of layers by applying pressure sufficient to reduce thickness of the layers to within approximately twenty percent (20%) of the part's final thickness;
   heating the debulked layers to a temperature above their glass transition temperature to partially cure the layers;
   forming the partially-cured layers into the part's final shape; and
   continuing the application of heat to the layers while holding them in the part's final shape with sufficient force to achieve and maintain the part's thickness and density and until the heating causes the layers to become sufficiently cured so that the part's final shape, thickness, and density are maintained.

2. The method of claim 1 wherein said debulking step further comprises heating the collection of composite layers so that the thickness of the layers can be reduced to within approximately the twenty percent (20%) of the part's final thickness.

3. The method of claim 1 further comprising the step of storing the debulked layers after the debulking step.

4. The method of claim 1 wherein said forming step comprises a plurality of serial forming steps to achieve the part's final shape.

5. The method of claim 1 wherein said forming step is achieved in one of an elastomeric diaphragm vacuum chamber bag, an autoclave, an oven, and a press.

6. The method of claim 1 wherein said heating and forming steps are simultaneous.

7. The method of claim 1 wherein said continuing the application of heat step is in a press having heating plates.

8. The method of claim 1 further comprising the step of cutting the composite layers into a part pattern prior to the laying-up step.

9. The method of claim 1 further comprising the step of cutting the debulked layers into a part pattern prior to the forming step.

10. A method for fabricating a composite part from a plurality of pre-forms, each pre-form made from a plurality of composite layers and having a shape, the part having a final shape, thickness, and density, the method comprising the steps of:
    a. laying-up composite layers one upon another to form a collection of layers in a configuration, each layer comprising a thermosetting matrix reinforced by fibers;
    b. debulking the configuration of layers by applying pressure sufficient to reduce thickness of the layers to within approximately twenty percent (20%) of the part's final thickness;
    c. heating the layers to a temperature above their glass transition temperature to partially cure the layers;
    d. forming the partially-cured layers into the shape of a pre-form;
    e. repeating steps a. through d. for all other pre-forms;
    f. arranging the pre-forms into the part's shape;
    g. heating the pre-forms to a temperature above their glass transition temperatures; and
    h. applying sufficient pressure to the heated pre-forms so as to join the pre-forms and to achieve and maintain the part's final thickness and density and until the heating causes the pre-forms to become sufficiently cured so that the part's final shape, thickness, and density are maintained.

11. The method of claim 10 further comprising the step of storing the debulked layers at room temperature after the debulking step.

12. The method of claim 10 wherein said debulking step further comprises heating the stack of composite layers so that the thickness of the layers can be reduced to within approximately the twenty percent (20%) of the parts final thickness.

13. The method of claim 10 further comprising the step of applying heat to the formed layers while holding the layers in the pre-form's shape and until the heating causes the pre-form's layers to become sufficiently cured so that the pre-form maintains its shape during subsequent processing.

14. The method of claim 10 wherein said forming step comprises a plurality of serial forming steps to achieve the pre-form's shape.

15. The method of claim 10 wherein the part is an I-beam.

16. The method of claim 10 further comprising the step of cutting the composite layers into a pre-form pattern prior to the laying-up step.

17. The method of claim 10 further comprising the step of cutting the debulked layers into a pre-form pattern prior to the forming step.

18. A method for fabricating a plurality of composite parts having a final shape, thickness, and density, the method comprising the steps of:
   a. laying-up a plurality of composite layers one upon another to form a collection of layers in a configuration, each layer comprising a thermosetting matrix reinforced by fibers;
   b. debulking the configuration of layers by applying pressure sufficient to reduce thickness of the layers to within approximately twenty percent (20%) of the part's final thickness;
   c. cutting a plurality of part cut-outs from the debulked layers;
   d. heating the cut-outs to a temperature above the glass transition temperature of the debulked layers to partially cure the layers;
   e. forming the partially-cured layers of a cut-out into a part's final shape;
   f. continuing the application of heat to the formed layers while holding them in the part's final shape with sufficient force to achieve and maintain the part's final thickness and density and until the heating causes the layers to become sufficiently cured so that the part's final shape, thickness, and density are maintained; and
   g. repeating steps e. through f. for all other parts.

19. The method of claim 18 further comprising the step of storing the debulked layers at room temperature after the debulking step.

20. The method of claim 18 wherein said forming step comprises a plurality of serial forming steps to achieve the part's final shape.

21. The method of claim 18 wherein said cutting step is accomplished with a ultrasonically vibrating knife.

22. The method of claim 18 wherein a plurality of parts are formed by simultaneously heating the plurality of cut-outs to a temperature above the glass transition temperature of the debulked layers, forming the cut-outs into each part's final shape, and continuing the application of heat to the formed cut-outs while holding them in their final shape with sufficient force to achieve and maintain each part's final thickness and density and until the heating causes the cut-outs to become sufficiently cured so that each part's shape, thickness, and density are maintained.

23. The method of claim 18 wherein the plurality of parts have nearly identical shape, thickness, and density.

24. The method of claim 18 wherein the plurality of parts have a plurality of shapes, thicknesses, and densities.

25. The method of claim 18 wherein said debulking step further comprises heating the collection of composite layers so that the thickness of the layers can be reduced to within approximately the twenty percent (20%) of the part's final thickness.

26. The method of claim 18 wherein said cutting step is performed with a programmable cutting device.

27. The method of claim 26 further comprising the steps of:
   establishing a data set defining each part's shape, thickness, and density with a computer aided design tool; and
   programming the automatic cutting device with the data set.

28. The method of claim 18 wherein said cutting step further comprises cutting the debulked layers at an angle so that the formed part has perpendicular end surfaces.

29. The method of claim 18 further comprising the step of inspecting the debulked layers with an automatic inspection system prior to the forming step.

30. The method of claim 18 wherein said laying-up step is accomplished with an automated placement machine.

31. A method for fabricating a plurality of composite parts from a plurality of pre-forms, each preform made from a plurality of composite layers and having a shape, each part having a final shape, thickness, and density, the method comprising the steps of:
   a. laying-up the composite layers one upon another to form a collection of layers in a configuration, each layer comprising a thermosetting matrix reinforced by fibers;
   b. debulking the configuration of layers by applying pressure sufficient to reduce thickness of the layers to within approximately twenty percent (20%) of the part's final thickness;
   c. cutting a plurality of preform cut-outs from the debulked layers;
   d. heating the cut-outs to a temperature above the glass transition temperature of the debulked layers to partially cure the layers;
   e. forming the partially-cured layers of a cut-out into a pre-form's shape;
   f. repeating step e. for all other pre-forms;
   g. arranging a part's pre-forms into a part's shape;
   h. heating the pre-forms to a temperature above their glass transition temperatures;
   i. applying sufficient pressure to the heated pre-forms so as to join the pre-forms and to achieve and maintain the part's final thickness and density and until the heating causes the pre-forms to become sufficiently cured so that the part's final shape, thickness, and density are maintained; and
   j. repeating steps g. through i. for all other parts.

32. The method of claim 31 wherein said forming step further comprises a plurality of serial forming steps to achieve the pre-forms.

33. The method of claim 31 wherein the plurality of parts have nearly identical shape, thickness, and density.

34. The method of claim 31 wherein the plurality of parts have a plurality of shapes, thicknesses, and densities.

35. The method of claim 31 wherein said debulking step further comprises heating the collection of composite layers so that the thickness of the layers can be reduced to within approximately the twenty percent (20%) of the parts' final thickness.

36. The method of claim 31 wherein said cutting step is performed with a programmable cutting device.

37. The method of claim 36 further comprising the steps of:
   establishing a data set defining each part's shape, thickness, and density with a computer aided design tool; and
   programming the automatic cutting device with the data set.

38. The method of claim 31 wherein said cutting step is accomplished with an ultrasonically cutting knife.

39. The method of claim 31 further comprising a step of inspecting the debulked layers with an automatic inspection system prior to said forming step.

40. The method of claim 31 further comprising a step of controlling the temperature and pressure of said debulking, heating, forming, and continuing the application of heat steps with an automated control system.

41. The method of claim 31 wherein said arranging step is performed by an automated pick and place system.

42. A method for fabricating a composite part from a plurality of composite layers, the part having a final shape, thickness, and density, the method comprising the steps of:

laying-up the composite layers one upon another to form a collection of layers in a configuration, each layer comprising a thermosetting matrix reinforced by fibers;

debulking the configuration of layers by applying pressure sufficient to reduce thickness of the layers;

heating the debulked layers to a temperature above their glass transition temperature to partially cure the layers;

forming the partially-cured layers into the part's final shape; and continuing the application of heat to the layers while holding them in the part's final shape with sufficient force to achieve and maintain the part's final thickness and density and until the heating causes the layers to become sufficiently cured so that the part's final shape, thickness, and density are maintained.

43. The method of claim 42 wherein said debulking step further comprises heating the collection of composite layers so that the thickness of the layers can be reduced to within approximately the twenty percent (20%) of the part's final thickness.

44. The method of claim 42 further comprising the step of storing the debulked layers after the debulking step.

45. The method of claim 42 wherein said forming step comprises a plurality of serial forming steps to achieve the part's final shape.

46. The method of claim 42 wherein said forming step is achieved in one of an elastomeric diaphragm vacuum chamber bag, an autoclave, an oven, and a press.

47. The method of claim 42 wherein said heating and forming steps are simultaneous.

48. The method of claim 42 wherein said continuing the application of heat step is in a press having heating plates.

49. The method of claim 42 further comprising the step of cutting the composite layers into a part pattern prior to the laying-up-step.

50. The method of claim 42 further comprising the step of cutting the debulked layers into a part pattern prior to the forming step.

51. A method for fabricating a composite part from a plurality of pre-forms, each pre-form made from a plurality of composite layers and having a shape, the part having a final shape, thickness, and density, the method comprising the steps of:

a. laying-up composite layers one upon another to form a collection of layers in a configuration, each layer comprising a thermosetting matrix reinforced by fibers;

b. debulking the configuration of layers by applying pressure to reduce the thickness of the layers;

c. heating the layers to a temperature above their glass transition temperature to partially cure the layers;

d. forming the partially-cured layers into the shape of a pre-form;

e. repeating steps a. through d. for all other pre-forms;

f. arranging the pre-forms into the part's shape;

g. heating the pre-forms to a temperature above their glass transition temperatures; and h. applying sufficient pressure to the heated pre-forms so as to join the pre-forms and to achieve and maintain the part's final thickness and density and until the heating causes the pre-forms to become sufficiently cured so that the part's final shape, thickness, and density are maintained.

52. The method of claim 51 further comprising the step of storing the debulked layers at room temperature after the debulking step.

53. The method of claim 51 wherein said debulking step further comprises heating the stack of composite layers so that the thickness of the layers can be reduced to within approximately the twenty percent (20%) of the parts final thickness.

54. The method of claim 51 further comprising the step of applying heat to the formed layers while holding the layers in the pre-form's shape and until the heating causes the pre-form's layers to become sufficiently cured so that the pre-form maintains its shape during subsequent processing.

55. The method of claim 51 wherein said forming step comprises a plurality of serial forming steps to achieve the pre-form's shape.

56. The method of claim 51 wherein the part is an I-beam.

57. The method of claim 51 further comprising the step of cutting the composite layers into a pre-form pattern prior to the laying-up step.

58. The method of claim 51 further comprising the step of cutting the debulked layers into a pre-form pattern prior to the forming step.

59. A method for fabricating a plurality of composite parts having a final shape, thickness, and density, the method comprising the steps of:

a. laying-up a plurality of composite layers one upon another to form a collection of layers in a configuration, each layer comprising a thermosetting matrix reinforced by fibers;

b. debulking the configuration of layers by applying pressure to reduce the thickness of the layers;

c. cutting a plurality of part cut-outs from the debulked layers;

d. heating the cut-outs to a temperature above the glass transition temperature of the debulked layers to partially cure the layers;

e. forming the partially-cured layers of a cut-out into each part's final shape;

f. continuing the application of heat to the formed layers while holding them in the part's final shape with sufficient force to achieve and maintain the part's final thickness and density and until the heating causes the layers to become sufficiently cured so that the part's final shape, thickness, and density are maintained; and g. repeating steps e. through f. for all other parts.

60. The method of claim 59 further comprising the step of storing the debulked layers at room temperature after the debulking step.

61. The method of claim 59 wherein said forming step comprises a plurality of serial forming steps to achieve the part's final shape.

62. The method of claim 59 wherein said cutting step is accomplished with a ultrasonically vibrating knife.

63. The method of claim 59 wherein the plurality of parts have nearly identical shape, thickness, and density.

64. The method of claim 59 wherein the plurality of parts have a plurality of shapes, thicknesses, and densities.

65. The method of claim 59 wherein said debulking step further comprises heating the collection of composite layers so that the thickness of the layers can be reduced to within approximately the twenty percent (20%) of the part's final thickness.

66. The method of claim 59 wherein said cutting step is performed with a programmable cutting device.

67. The method of claim 66 further comprising the steps of:

establishing a data set defining each part's shape, thickness, and density with a computer aided design tool; and programming the automatic cutting device with the data set.

68. The method of claim 59 wherein said cutting step further comprises cutting the debulked layers at an angle so that the formed part has perpendicular end surfaces.

69. The method of claim 59 further comprising the step of inspecting the debulked layers with an automatic inspection system prior to the forming step.

70. The method of claim 59 wherein said laying-up step is accomplished with an automated placement machine.

71. A method for fabricating a plurality of composite parts from a plurality of pre-forms, each preform made from a plurality of composite layers and having a shape, each part having a final shape, thickness, and density, the method comprising the steps of:

a. laying-up the composite layers one upon another to form a collection of layers in a configuration, each layer comprising a thermosetting matrix reinforced by fibers;

b. debulking the configuration of layers by applying pressure sufficient to reduce thickness of the layers;

c. cutting a plurality of preform cut-outs from the debulked layers;

d. heating the cut-outs to a temperature above the glass transition temperature of the debulked layers to partially cure the layers;

e. forming the partially-cured layers of a cut-out into a pre-form's shape;

f. repeating step e. for all other pre-forms;

g. arranging a part's pre-forms into a part's shape;

h. heating the pre-forms to a temperature above their glass transition temperatures;

i. applying sufficient pressure to the heated pre-forms so as to join the pre-forms and to achieve and maintain the part's final thickness and density and until the heating causes the pre-forms to become sufficiently cured so that the part's final shape, thickness, and density are maintained; and j. repeating steps g. through i. for all other parts.

72. The method of claim 71 wherein said forming step further comprises a plurality of serial forming steps to achieve the pre-forms.

73. The method of claim 71 wherein the plurality of parts have nearly identical shape, thickness, and density.

74. The method of claim 71 wherein the plurality of parts have a plurality of shapes, thicknesses, and densities.

75. The method of claim 71 wherein said debulking step further comprises heating the collection of composite layers so that the thickness of the layers can be reduced to within approximately the twenty percent (20%) of the parts' final thickness.

76. The method of claim 71 wherein said cutting step is performed with a programmable cutting device.

77. The method of claim 76 further comprising the steps of:

establishing a data set defining each part's shape, thickness, and density with a computer aided design tool; and programming the automatic cutting device with the data set.

78. The method of claim 71 wherein said cutting step is accomplished with an ultrasonically cutting knife.

79. The method of claim 71 further comprising a step of inspecting the debulked layers with an automatic inspection system prior to said forming step.

80. The method of claim 71 further comprising a step of controlling the temperature and pressure of said debulking, heating, forming, and continuing the application of heat steps with an automated control system.

81. The method of claim 71 wherein said arranging step is performed by an automated pick and place system.

* * * * *